(12) United States Patent
Prociw et al.

(10) Patent No.: US 7,805,948 B2
(45) Date of Patent: Oct. 5, 2010

(54) INTERNALLY MOUNTED DEVICE FOR A PRESSURE VESSEL

(75) Inventors: Lev Alexander Prociw, Elmira (CA); Aleksandar Kojovic, Oakville (CA); Honza Stastny, Georgetown (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1192 days.

(21) Appl. No.: 11/300,477

(22) Filed: Dec. 15, 2005

(65) Prior Publication Data

US 2007/0137218 A1    Jun. 21, 2007

(51) Int. Cl.
*F02C 7/20* (2006.01)
(52) U.S. Cl. ......................................................... 60/796
(58) Field of Classification Search ................... 60/796, 60/798, 740
See application file for complete search history.

(56) References Cited

U.S. PATENT DOCUMENTS

| 2,548,904 | A | | 4/1951 | Neal et al. |
|---|---|---|---|---|
| 3,159,971 | A | | 12/1964 | Moebius et al. |
| 3,879,940 | A | | 4/1975 | Stenger et al. |
| 4,216,651 | A | | 8/1980 | Ormerod |
| 4,441,323 | A | | 4/1984 | Colley |
| 4,453,384 | A | * | 6/1984 | Pask ............................. 60/737 |
| 4,466,240 | A | | 8/1984 | Miller |
| 4,730,453 | A | * | 3/1988 | Benoist et al. ................. 60/764 |
| 5,305,609 | A | * | 4/1994 | Guinan et al. .................. 60/740 |
| 5,328,101 | A | | 7/1994 | Munshi |
| 5,771,696 | A | | 6/1998 | Hansel et al. |
| 6,829,883 | B2 | * | 12/2004 | Sathianathan et al. ...... 60/226.1 |
| 2005/0172641 | A1 | * | 8/2005 | Czachor ....................... 60/796 |

* cited by examiner

*Primary Examiner*—Michael Cuff
*Assistant Examiner*—Andrew Nguyen
(74) *Attorney, Agent, or Firm*—Ogilvy Renault LLP

(57) ABSTRACT

An assembly for sealingly mounting a device in a hole in a pressure vessel casing, the assembly transferring a load produced by pressurized fluid to the casing and retaining the stem to the casing.

16 Claims, 4 Drawing Sheets

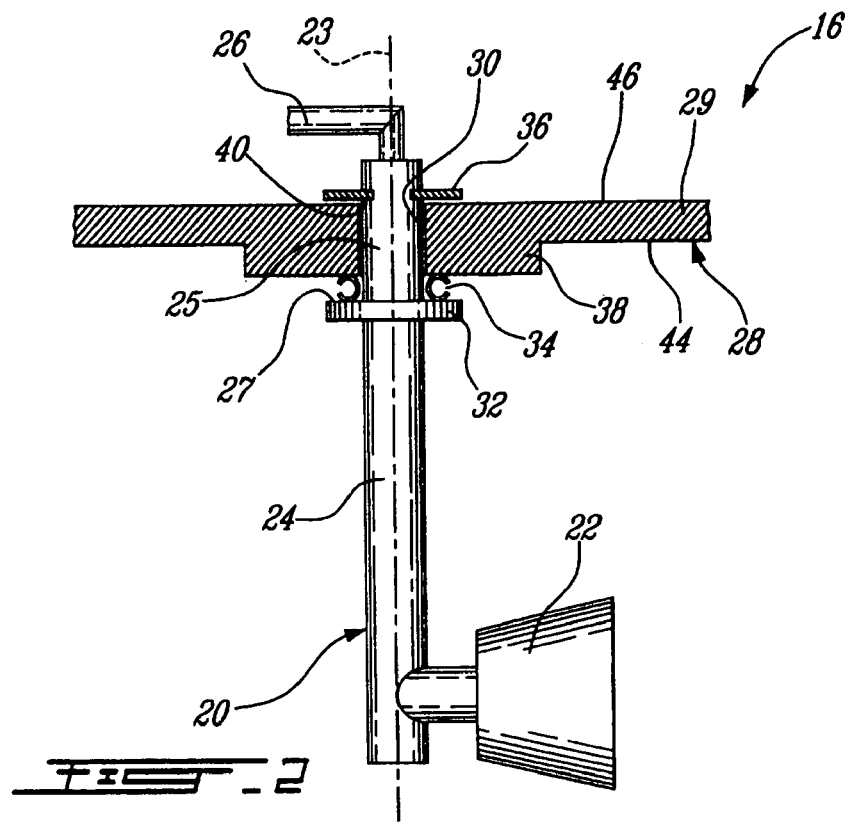
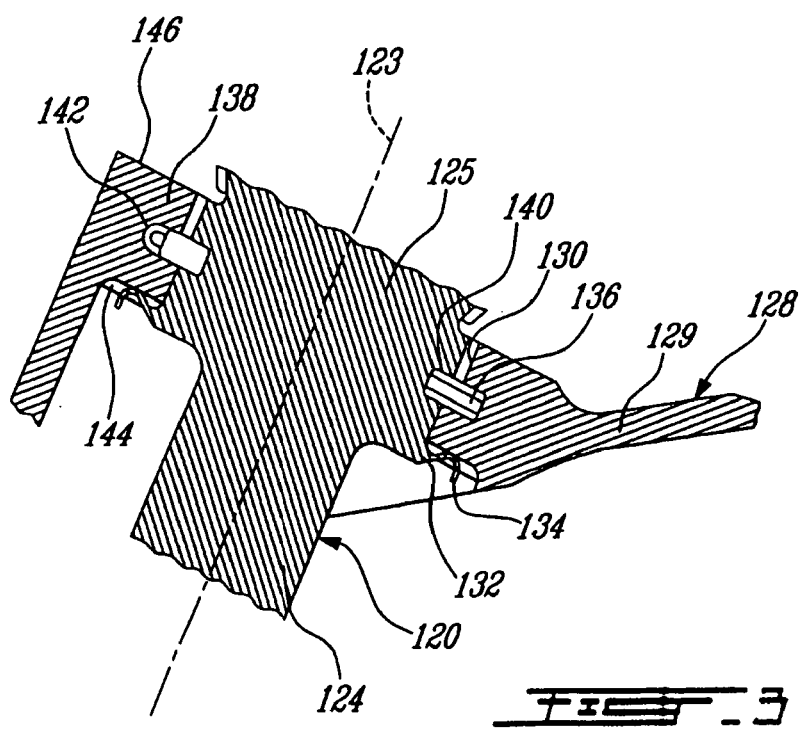

INTERNALLY MOUNTED DEVICE FOR A PRESSURE VESSEL

TECHNICAL FIELD

The invention relates generally to pressure vessels and, more particularly, to improved devices for mounting in such vessels.

BACKGROUND OF THE ART

Gas turbine engines usually include a pressure vessel portion surrounded by a casing receiving compressed air from the compressor section, and into which several devices project, for example fuel nozzles, ignitors, etc. Generally, a plurality of holes are provided in the casing through which such devices extend, with the casing usually being reinforced in the portion around the holes by flanged areas or bosses. The devices, e.g. fuel nozzles, typically include an extending flange which mates with the reinforced portion around the respective hole on the exterior surface of the combustor casing. The reinforced portion and flange may further include additional aligned threaded holes which receive fasteners, such as bolts, to retain the flange to the casing and ensure an adequate seal between the devices and the casing through which they project. The flange and reinforced portion must be thick enough not to distort under the high temperature and pressures to which they are exposed, since the compressed air within the casing will produce a force which acts to separate the flange from the reinforced portion in an attempt to force the device out through the corresponding hole in the casing. Such an "exterior" mounting of the device on the combustor casing requires relatively complex and heavy fastening and sealing means, however is commonly used because of the ease with which such devices can be removed from the outside of the casing if required, for maintenance purposes for example.

Accordingly, there is a need to provide an improved device mounted within a pressure vessel such as are found in gas turbine engines.

SUMMARY OF THE INVENTION

It is therefore an object of this invention to provide an improved device mounted within a pressure vessel casing.

In one aspect, the present invention provides an assembly comprising: a casing having a casing wall defining an enclosure therewithin, the casing wall having an inner wall surface facing the enclosure, the casing wall being adapted to contain a pressurized fluid that is disposed within the enclosure and which applies a outward pressure against the casing wall, the casing wall including at least one hole define therethrough; at least one device, the device including an outer end located outside of the enclosure, an inner end located inside of the enclosure, and a stem connecting the outer and inner ends, the stem passing through the hole, the stem including first means for transferring a load produced by the pressure of the pressurized fluid to the casing wall by one of direct contact with the inner surface and contact with the inner surface through a sealing element, the first means sealing the hole when the load is transferred and preventing the stem from being removed from the hole in an outward direction defined along an axis of the stem toward the outside of the enclosure; and second means engaged with the device and the casing for retaining the stem in place within the hole and preventing movement of the stem in an inward direction defined along the axis of the stem toward the inside of the enclosure, the second means being substantially free of the load transferred by the first means, the second means being disengageable from at least one of the device and the casing to remove the stem from the hole in the inward direction.

In another aspect, the present invention provides an assembly comprising: a pressure vessel casing adapted to contain at least pressurized fluid, the pressure vessel casing having a wall defined by annular inner and outer surfaces with at least one hole defined therethrough, at least one device including an inner end and an outer end interconnected by an elongated stem, the stem being located within the hole, the inner and outer ends being respectively located inside and outside of the casing, the stem including a flange extending outwardly therefrom across a distance greater than a diameter of the hole and being disposed inside the casing adjacent to the inner surface, a portion of the inner surface aligned with the flange encompassing a border region of the hole, the flange preventing the stem to be removed from the hole in an outward direction defined along an axis of the stem toward the outside of the casing, a sealing element located between the stem of the device and the casing, the flange pressed against the inner surface by the pressurized fluid cooperating with the sealing element to seal the hole, and a removable retaining element retaining the device to the casing against movement in an inward direction defined opposite of the outward direction, the stem of the device being disengeagable from the casing through the hole in the inward direction upon removal of the retaining element.

In a further aspect, the present invention provides a fuel nozzle assembly adapted to be received in a hole of a combustor casing in a gas turbine engine, the assembly comprising: a manifold interface and a nozzle tip interconnected by a stem, the stem being smaller than the hole and providing fluid communication between the manifold interface and the nozzle tip, the manifold interface being at least one of smaller than the hole and detachable from the stem, a flange extending outwardly from the stem relative to a longitudinal axis thereof, the flange being larger than the hole such as to prevent the stem from passing therethrough, and a retaining element removably engaging the stem between the manifold interface and the flange, the retaining element extending outwardly from the stem relative to the longitudinal axis, the retaining element being larger than the hole such as to prevent the stem from passing therethrough.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 2 is a schematic side view of a mounting of a fuel nozzle in a combustor according to an aspect of the present invention;

FIG. 3 is a schematic partial side view of a mounting for a device in a pressure vessel according to an alternative aspect of the present invention;

DETAILED DESCRIPTION OF THE PREFERRED EMBODIMENTS

Figure 1:
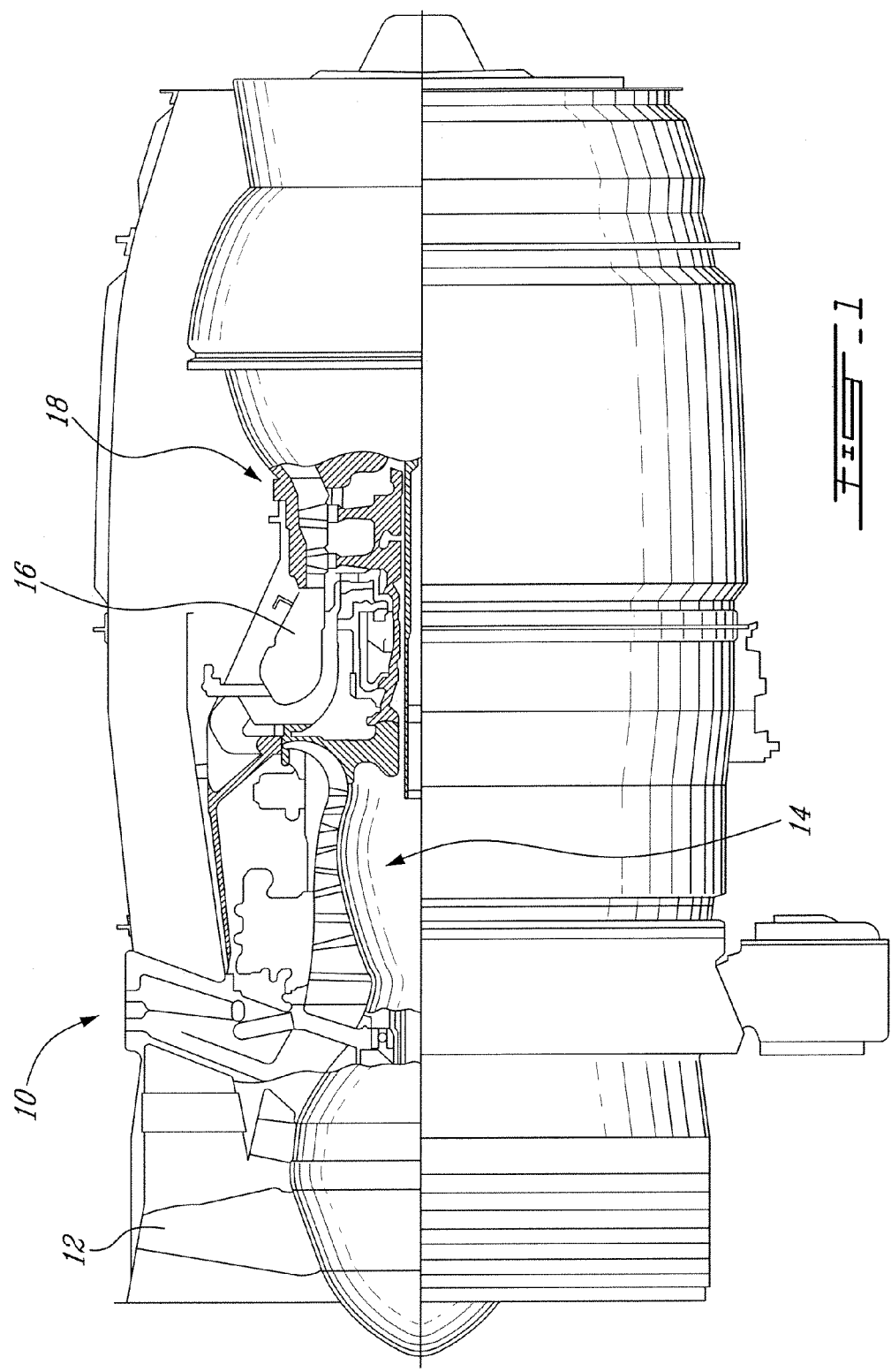
FIG. 1 is a schematic side view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Referring to FIG. 2, the combustor 16 includes a casing 28 having a liner wall 29 defined by an outer surface 46 and an inner surface 44, the inner surface 44 defining an enclosure receiving compressed air from the compressor 14 (see FIG. 1). Although the combustor 16 is shown in FIG. 1 as being part of a turbofan engine 10, it is understood that the combustor 16 can be part of various other types of gas turbine engines, for example a turboprop engine or a stationary industrial gas turbine engine.

The casing 28 includes at least one array of circumferentially spaced apart holes 30 defined through the wall 29, only one of which is shown, with each hole 30 receiving a device 20 therein. The casing wall 29 preferably includes a reinforced portion 38 of increased thickness around each hole 30, although if the thickness of the casing wall 29 is sufficient such a reinforced portion 38 can be omitted. Further, although some additional support is provided by the reinforced portion 38, as no threaded fasteners are required for securing the device 20 to the casing 28, this reinforced portion 38 need not nearly be as thick as those of the prior art through which threaded holes for fastening bolts therein are required.

The device 20 received within the hole 30 is preferably a fuel nozzle, which includes an inner end or nozzle tip 22, an outer end or manifold interface 26 for connecting the fuel nozzle 20 to a fuel manifold (not shown), and a body portion or stem 24 connecting the nozzle tip 22 to the manifold interface 26. The stem 24 includes an outer portion 25 adjacent the manifold interface 26 and the hole 30 is sized such that at least this outer portion 25 can be inserted therethrough, with the nozzle tip 22 being located inside the casing 28, the manifold interface 26 being located outside the casing 28, and a longitudinal axis 23 of the stem 24 preferably passing through the center of the hole 30. The hole 30 is also preferably sized such that the manifold interface 26 can pass therethrough. Alternatively, the manifold interface 26 can be detachable from the outer portion 25 of stem 24 such as to remain outside of the casing 28 when the fuel nozzle 20 is removed from the inside of the casing 28, in which case the hole 30 need only be sufficiently large to closely fit the outer stem portion 25 therein.

Although the device described herein is the fuel nozzle 20, it is understood that the device can be of another type, including but not limited to, an ignitor, a support member, etc.

The stem 24 includes a flange 32, preferably circular, extending outwardly from the stem 24 relative to the axis 23, located inside the casing 28 and having an outer surface 27 adjacent the inner surface 44 of the casing wall 29. The flange 32 is sized to be larger than the hole 30, so that the portion of the inner surface 44 which is aligned with the flange 32 includes a border region of the inner surface 44 surrounding the hole 30. Accordingly, the flange 32 requires the fuel nozzle 20 to be inserted in the hole 30 from the inner side of the casing wall 29. The flange 32 is preferably separated from the inner surface 44 by a sealing element 34, which in one embodiment includes an annular sealing ring with a C-shaped cross-section. The flange 32, being larger than the hole 30, and disposed on an inner side of the casing wall 29, prevents the stem 24 from sliding out of the hole 30 in an outward direction, i.e. along the axis 23 of the stem 24 toward the outside of the casing 28 The stem 24 includes an annular groove 40 spaced apart from the flange 32 in a direction away from the nozzle tip 22 such as to be located outside of the casing 28, adjacent the outer surface 46 when the stem 24 is inserted into the hole 30 with the outer surface 27 of the flange 32 adjacent the inner surface 44 of the casing wall 29. A retaining element, such as a retaining clip 36, engages the annular groove 40. The retaining clip 36 is sized to be larger than the hole 30 to abut a border region of the outer surface 46 which surrounds the hole 30, thus preventing the stem 24 from moving in an inward direction, i.e. along the axis 23 of the stem 24 toward the inside of the casing 28. The retaining clip 36 can be removed to permit the movement in the inward direction of the stem 24 allowing the nozzle 20 to be disengaged from the hole 30.

Alternative retaining means for the retaining clip 36 include, for example, a nut threaded around a threaded portion of the stem 24, a pin inserted in a hole extending transversely through the stem 24, etc.

In use, the sealing element 34 is placed around the stem 24 against the outer surface 27 of the flange 32, and the fuel nozzle 20 is inserted into the hole 30. This is done from the inside of the casing 28, i.e. by passing the manifold interface 26, then the outer portion 25 of the stem 24, through the hole 30 in the outward direction until the annular groove 40 is located outside of the casing 28. The outward motion is stopped by contact of the sealing element 34, pressed by the flange 32, with the inner surface 44 at the periphery of the hole 30. The retaining clip 36 is engaged with the groove 40 in the stem 24 to prevent the nozzle 20 from sliding out of the hole 30 in the inward direction.

When the combustor 16 is used, the pressurized fluid, in this case air, within the casing 28 acts to push the flange 32 against the inner surface 44, compressing the sealing element 34 and thus sealing the hole 30. The load produced by the pressurized air is transferred directly from the flange 32 to the casing 28 through the sealing element 34, with the retaining clip 36 being free substantially of that pressure-induced load. As such, the retaining clip 36 can be relatively small and lightweight.

When the fuel nozzle 20 needs to be removed, the retaining clip 36 is disengaged from the nozzle groove 40, and the stem 24 is free to slide in the inward direction to remove the fuel nozzle 20 from the inside of the casing 28.

Referring to FIG. 3, an alternative mounting of a device 120 in a pressure vessel casing such as a combustor casing 128 is shown. A plurality of holes 130 are defined through a wall 129 of the casing 128, only one of which is shown, with the casing wall 129 also preferably including a reinforced portion 138 of increased thickness around each hole 130. Each hole 130 also includes, within the wall 129 of the casing 128, an annular groove 142, which is preferably defined at mid-distance between inner and outer surfaces 144, 146 of the casing wall 129. The device 120, which can be for example a fuel nozzle, has a stem 124 (only part of which is shown) having an outer portion 125 inserted into the hole 130, the stem 124 interconnecting an inner end (not shown) located inside the casing 128 and an outer end (not shown) located outside of the casing 128. The hole 130 is also preferably sized such that the outer end can pass through.

The stem 124 includes a flange 132 extending outward therefrom relative to a central stem axis 123, located inside the casing 128 and adjacent the inner surface 144. The flange 132 includes at its outer periphery a flexible integral sealing element 134, which abuts the inner surface 144 in a border region surrounding the hole 130. The flange 132, larger than the hole 130, prevents the stem 124 from sliding out of the hole 130 in an outward direction, i.e. along the axis 123 of the stem 124 toward the outside of the casing 128. The pressurized fluid within the casing 128 pushes the sealing element 134 of the flange 132 against the inner surface 144, where it is deflected and seals the hole 130. The load produced by the pressurized fluid is transferred directly from the flange 132 to the casing 128 through the sealing element 134.

The outer portion 125 of the stem 124 includes an annular groove 140 located such that when the outer portion 125 is placed inside the hole 130, the annular groove 140 is in alignment with the annular groove 142 defined in the casing 128. A retaining clip 136 engages the aligned annular grooves 140,142. The retaining clip 136 prevents the stem 124 from sliding with respect to the casing 128, particularly in an inward direction, i.e. along the axis 123 of the stem 124 toward the inside of the casing 128. The retaining clip 136 can be removed such as to permit the movement in the inward direction of the stem 124 to disengage the device 120 from the hole 130.

Figure 4:
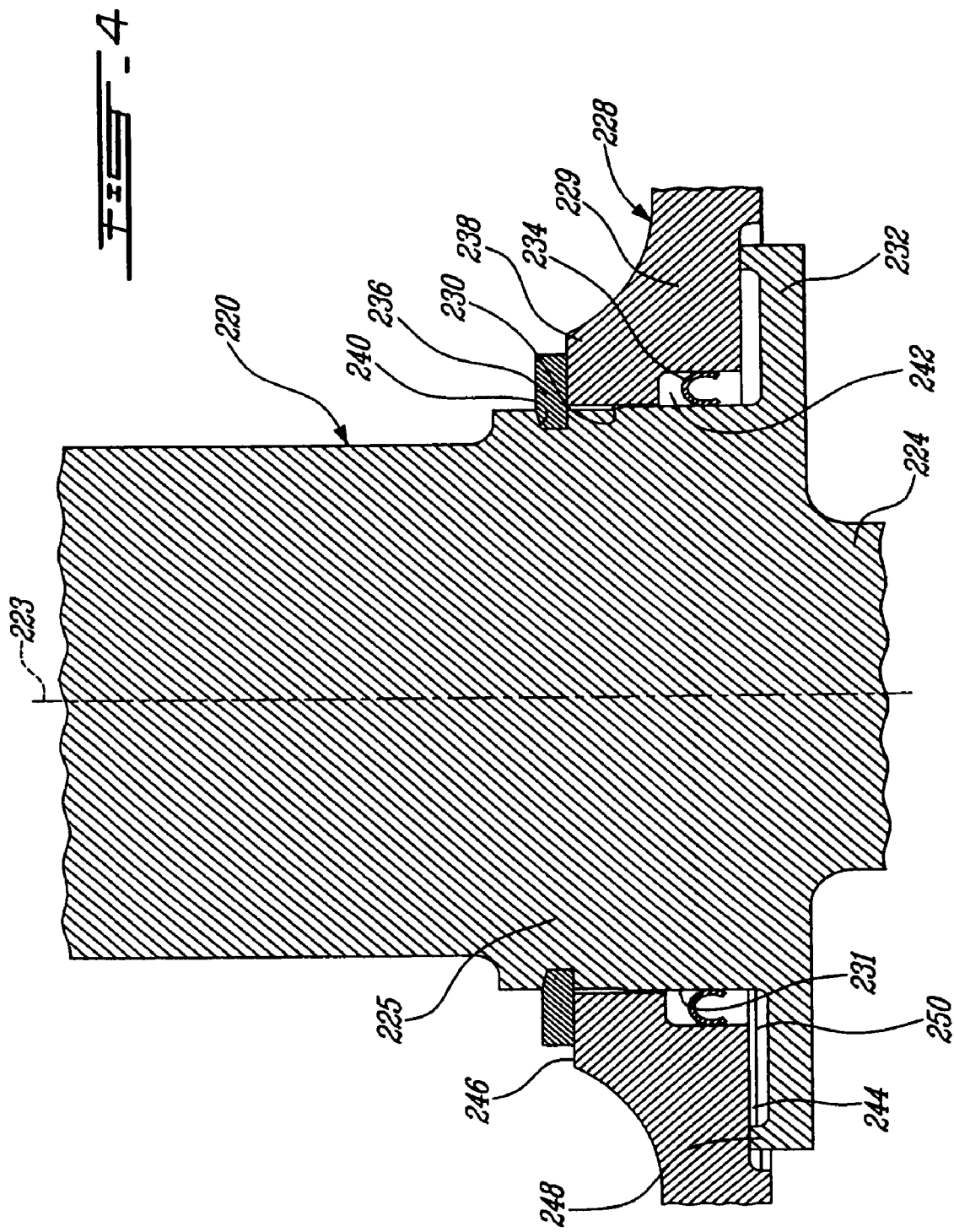
FIG. 4 is a schematic partial side view of a mounting for a device in a pressure vessel according to another alternative aspect of the present invention.

Referring to FIG. 4, another alternative mounting of a device 220 in a pressure vessel casing such as a combustor casing 228 is shown. A plurality of holes 230 are defined through a wall 229 of the casing 228, only one of which is shown, with the casing wall 229 also preferably including a reinforced portion 238 of increased thickness around each hole 230. At the periphery of each hole 230, an annular groove 242 is defined in an inner surface 244 of the wall 229. The device 220, which can be for example a fuel nozzle, has a stem 224 (only part of which is shown) having an outer portion 225 inserted into the hole 230, the stem 224 interconnecting an inner end (not shown) located inside the casing 228 and an outer end (not shown) located outside of the casing 228. The hole 230 is also preferably sized such that the outer end can pass through.

The stem 224 includes a flange 232 extending outward therefrom relative to a central stem axis 223, located inside the casing 228 and adjacent the inner surface 244. The flange 232 includes at its outer periphery a border 248, extending toward and abutting a border region of the inner surface 244 of the wall 229 surrounding the hole 230. The raised border 248 creates an annular cavity 250 between the flange 232 and the inner surface 244 which is in fluid communication with the annular groove 242. An annular sealing element 234, preferably having a C-shaped cross-section, is pressed between an annular outer surface 231 of the outer stem portion 225 and the wall 229 of the casing 228 within the groove 242. The flange 232, larger than the hole 230, prevents the stem 224 from sliding out of the hole 230 in an outward direction, i.e. along the axis 223 of the stem 224 toward the outside of the casing 228. The pressurized fluid within the casing 228 pushes the flange 232 against the inner surface 244, thus sealing the hole 230. The load produced by the pressurized fluid is transferred directly from the flange 232 to the casing 228 through the border 248.

The stem 224 includes an annular groove 240 spaced apart from the flange 232 in a direction away from the inner end such as to be located outside of the casing 228, adjacent the outer surface 246 of the casing wall 229 when the stem 224 is inserted into the hole 230 with the flange 232 adjacent the inner surface 244 of the casing wall 229. A retaining clip 236 engages the annular groove 240 and abuts a border region of the outer surface 246 which surrounds the hole 230, thus preventing the stem 224 from moving in an inward direction, i.e. along the axis 223 of the stem 224 toward the inside of the casing 228. The retaining clip 236 can be removed such as to permit the inward movement of the stem 224 to disengage the device 220 from the hole 230.

Figure 5:
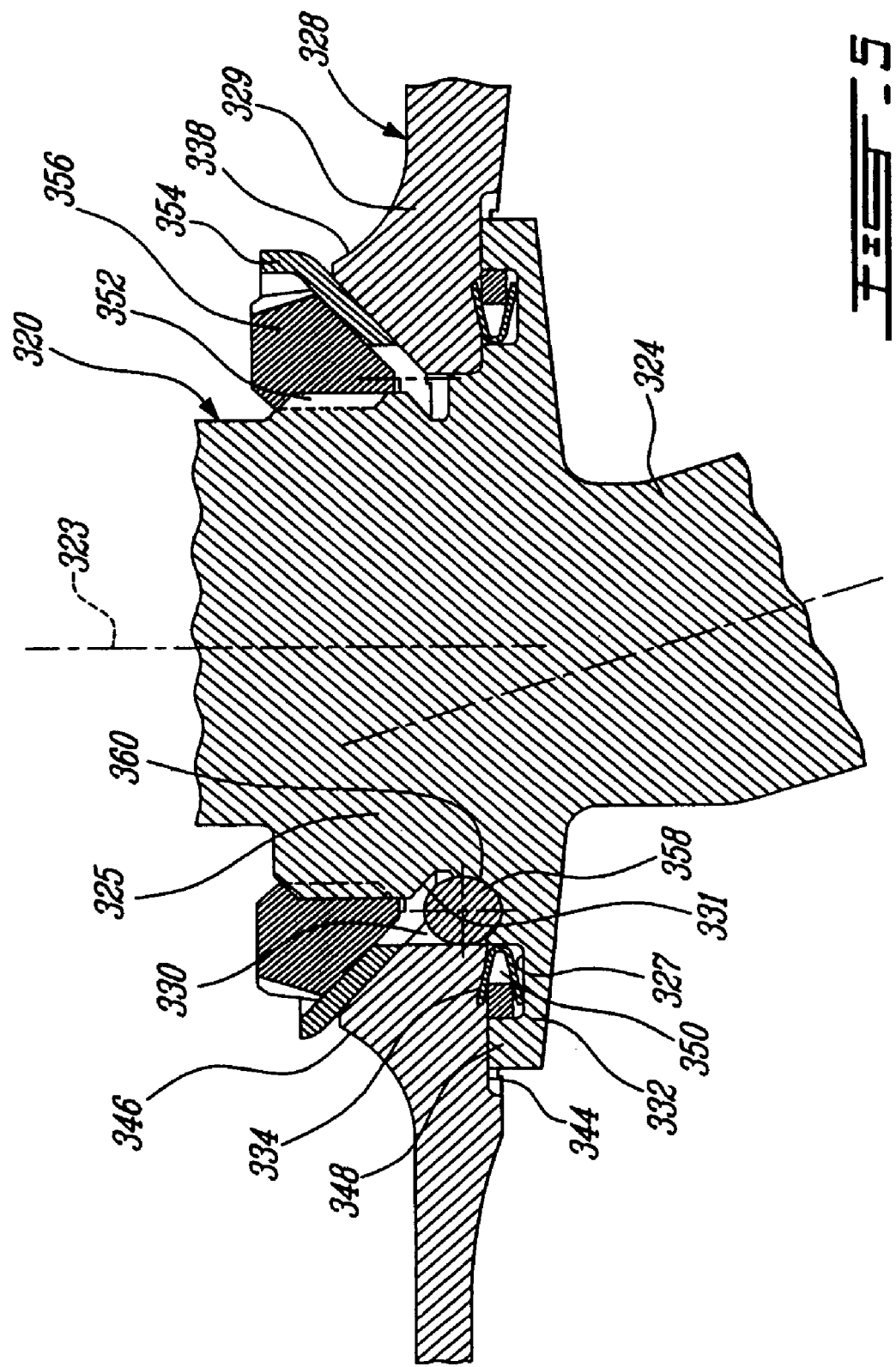
FIG. 5 is a schematic partial side view of a mounting for a device in a pressure vessel according to a further aspect of the present invention.

Referring to FIG. 5, a further alternative mounting of a device 320 in a pressure vessel casing, such as a combustor casing 328, is shown. A plurality of holes 330 are defined through a wall 329 of the casing 328 (only one of which is shown), with the casing wall 329 also preferably including a reinforced portion 338 of increased thickness around each hole 330. The device 320, which can be for example a fuel nozzle, has a stem 324 (only part of which is shown) having an outer portion 325 inserted into the hole 330, the stem 324 interconnecting an inner end (not shown) located inside the casing 328 and an outer end (not shown) located outside of the casing 328. The hole 330 is also preferably sized such that the outer end of the stem 324 can pass therethrough.

The stem 324 includes a flange 332 extending outward therefrom relative to a central outer stem portion axis 323, located inside the casing 328 and adjacent the inner surface 344 of the casing 328. The flange 332 includes at its outer periphery a border 348, extending toward and abutting a border region of the inner surface 344 of the wall 329 surrounding the hole 330. The raised border 348 creates an annular cavity 350 between the flange 332 and the inner surface 344. An annular sealing element 334, preferably a seal having a U-shaped cross-section, is located in the annular cavity 350 and pressed between the outer surface 327 of the flange 332 and the inner surface 344 of the casing 328. The flange 332, larger than the hole 330, prevents the stem 324 from sliding out of the hole 330 in an outward direction, i.e. along the axis 323 of the stem 324 toward the outside of the casing 328. The pressurized fluid within the casing 328 pushes the flange 332 against the inner surface 344, thus sealing the hole 330. The load produced by the pressurized fluid is transferred directly from the flange 332 to the casing 328 through the border 348.

The stem 324 includes an annular threaded portion 352 spaced apart from the flange 332 in a direction away from the inner end such as to be located outside of the casing 328, adjacent the outer surface 346 of the casing wall 329 when the stem 324 is inserted into the hole 330 with the flange 332 adjacent the inner surface 344 of the casing wall 329. A cap washer 354 is inserted around the stem 324 and abuts a border region of the outer surface 346 which surrounds the hole 330. A nut 356 threadingly engages the annular threaded portion 352 and abuts the cap washer 354, thus preventing the stem 324 from moving in an inward direction, i.e. along the axis 323 toward the inside of the casing 328. The nut 356 and washer 354 can be removed such as to permit the inward movement of the stem 324 to disengage the device 320 from the hole 330. Optionally, a ball tack 358 is received in a corresponding groove 360 in the outer surface 331 of the stem outer portion 325 to abut the casing wall 329 within the hole 330. The ball tack 358 facilitates the installation of the stem 324 within the hole 330 by forcing the stem 324 to be inserted with the proper orientation.

All of the above described embodiments can be applied to the mounting of similar devices 20,120,220,320 in pressure vessel casings 28,128,228,328 other than combustor casings, such as, for example, bypass ducts in the compressor region of a gas turbine engine, or in any appropriate non-gas turbine applications where a vessel contains pressurized fluid.

The "interior" mounting of the device 20,120,220,320 to the casing 28,128,228,328 as herein described is particularly useful in cases where the frequency removal of the device is reduced to intervals corresponding to general engine overhaul periods.

When compared to an "exterior" mounting typical of the prior art, the "interior" mounting described herein presents several advantages. In an "exterior" mounting, the pressurized air tends to separate the flange from the casing, and as such the retaining means need to counteract that effect, producing increased loads and potential distortions on the flange and casing. In contrast, in the "interior" mounting of the present invention such increased loads are not produced in the flange 32,132,232,332 and reinforced portions 38,138,238, 338 of the casing 28,128,228,328 since the pressurized air tends to press the flange 32,132,232,332 and reinforced portions 38,138,238,338 together. As such, the flange 32,132, 232,332 and reinforced portions 38,138,238,338 can have a reduced thickness, which leads to lighter and less costly devices 20,120,220,320 and casings 28,128,228,328. Also, a smaller flange 32,132,232,332 reduces the flange mass, which in turns reduces the heat transfer from the hot inner surface 44,144,244,344 to the device 20,120,220,320 though the flange 32,132,232,332. Because the pressurized air tends to press the flange 32,132,232,332 and reinforced portions 38,138,238,338 together, the air pressure improves the seal of the holes 30,130,230,330. Thus, the pressure differential across the casing 28,128,228,328 improves the seal between the device 20,120,220,320 and the casing wall 29,129,229, 329, and dispenses with the need for complex and strong fasteners the prior art used to act against the pressure differential in order to maintain an adequate seal. The hole 30,130, 230,330, which, contrary to the "exterior" mounting, does not have to be larger than the nozzle tip 22 or device inner end, can thus be smaller, which reduces the risks of leakage.

The above description is meant to be exemplary only, and one skilled in the art will recognize that changes may be made to the embodiments described without department from the scope of the invention disclosed. For example, elements of two or more embodiments can be combined to produce another configuration for the mounting of devices 20,120, 220,320 within the casing 28,128,228,328. Still other modifications which fall within the scope of the present invention will be apparent to those skilled in the art, in light of a review of this disclosure, and such modifications are intended to fall within the appended claims.

The invention claimed is:

1. An assembly comprising:
a casing having a casing wall defining an enclosure therewithin, the casing wall having an inner wall surface facing the enclosure, the casing wall being adapted to contain a pressurized fluid that is disposed within the enclosure and which applies a outward pressure against the casing wall, the casing wall including at least one hole define therethrough;
at least one device, the device including a fuel nozzle having an outer end located outside of the enclosure and including a manifold interface, an inner end located inside of the enclosure and including a nozzle tip, and a stem connecting the outer and inner ends, the stem passing through the hole, the stem including first means for transferring a load produced by the pressure of the pressurized fluid to the casing wall by one of direct contact with the inner surface and contact with the inner surface through a sealing element, the first means sealing the hole when the load is transferred and preventing the stem from being removed from the hole in an outward direction defined along an axis of the stem toward the outside of the enclosure; and
second means mounted on the stem and engaged with the casing for retaining the stem in place within the hole and preventing movement of the stern in an inward direction defined along the axis of the stem toward the inside of the enclosure, the second means being substantially free of the load transferred by the first means, the second means being disengageable from at least one of the device and the casing to remove the stem from the hole in the inward direction.

2. The assembly according to claim 1, wherein the first means transfers the load by contact with the inner surface through the sealing element, and the sealing element is integral with the first means.

3. The assembly according to claim 1, wherein the first means includes a flange extending outwardly from the stem, the flange being disposed inside the casing adjacent the inner surface and transferring the load by direct contact with the inner surface in a border region of the hole.

4. The assembly according to claim 1, wherein the first means includes a flange extending outwardly from the stem, the flange being disposed inside the casing adjacent the inner surface and transferring the load by contact with the inner surface through the sealing element, the sealing element abutting a border region of the hole.

5. The assembly according to claim 1, wherein the second means include a retaining clip engaged with an annular groove defined in the stem and abutting an outer wall surface of the casing wall, the outer wall surface being located outside of the enclosure.

6. The assembly according to claim 1, wherein the second means include a retaining clip engaged with first and second annular grooves, the first annular groove being defined in the stem and the second annular groove being defined in the casing wall within the hole.

7. An assembly comprising:
a pressure vessel casing adapted to contain at least pressurized fluid, the pressure vessel casing having a wall defined by annular inner and outer surfaces with at least one hole defined therethrough;
at least one device including a fuel nozzle having an inner end and an outer end interconnected by an elongated stem, the stem being located within the hole, the inner and outer ends being respectively located inside and outside of the casing, the stem including a flange extending outwardly therefrom across a distance greater than a diameter of the hole and being disposed inside the casing adjacent to the inner surface, a portion of the inner surface aligned with the flange encompassing a border region of the hole, the flange preventing the stem to be removed from the hole in an outward direction defined along an axis of the stem toward the outside of the casing;
a sealing element located between the stem of the device and the casing, the flange pressed against the inner surface by the pressurized fluid cooperating with the sealing element to seal the hole; and
a removable retaining element fastened outside the casing exclusively to the stem and retaining the device to the casing against movement in an inward direction defined opposite of the outward direction without preventing movement in the outward direction, the stem of the device being disengageable from the casing through the hole in the inward direction upon removal of the retaining element.

8. The assembly according to claim 7, wherein the at least one device includes a plurality of fuel nozzles, the outer end of each of the fuel nozzles including a manifold interface and the inner end of each of the fuel nozzles including a nozzle tip.

9. The assembly according to claim 7, wherein the sealing element is located between the flange and the inner surface.

10. The assembly according to claim 7, wherein the stem of the device includes an annular groove defined therein, and the retaining element includes an annular retaining clip engaged with the annular groove.

11. The assembly according to claim 7, wherein the sealing element is a flexible peripheral portion of the flange.

12. A fuel nozzle assembly adapted to be received in a hole of a combustor casing in a gas turbine engine, the assembly comprising:
   a manifold interface and a nozzle tip interconnected by a stem, the stem being smaller than the hole and providing fluid communication between the manifold interface and the nozzle tip, the manifold interface being at least one of smaller than the hole and detachable from the stem;
   a flange extending outwardly from the stem relative to a longitudinal axis thereof, the flange being larger than the hole such as to prevent the stem from passing therethrough; and
   a sealing element located between the flange and an inner surface of the casing; and a retaining element fastened outside the casing exclusively to the stem independently of the combustor casing between the manifold interface and the flange, the retaining element extending outwardly from the stem relative to the longitudinal axis, the retaining element being larger than the hole such as to prevent the stem from passing therethrough.

13. The fuel nozzle assembly according to claim 12, wherein the retaining element includes an annular retaining clip engageable with an annular groove defined in the stem between the manifold interface and the flange.

14. The fuel nozzle assembly according to claim 12, wherein the retaining element includes a nut threadingly engageable with a threaded portion of the stem located between the manifold interface and the flange.

15. The fuel nozzle assembly according to claim 12, wherein the flange has a flexible peripheral portion acting as a sealing element.

16. The fuel nozzle assembly according to claim 12, wherein the flange includes at its outer periphery a raised border extending toward the manifold interface.

* * * * *